United States Patent
Wang et al.

(10) Patent No.: US 10,594,945 B2
(45) Date of Patent: Mar. 17, 2020

(54) GENERATING DOLLY ZOOM EFFECT USING LIGHT FIELD IMAGE DATA

(71) Applicant: Google LLC, Mountain View, CA (US)

(72) Inventors: Zejing Wang, Mountain View, CA (US); Joel Merritt, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 109 days.

(21) Appl. No.: 15/944,551

(22) Filed: Apr. 3, 2018

(65) Prior Publication Data
US 2018/0288335 A1      Oct. 4, 2018

Related U.S. Application Data

(60) Provisional application No. 62/481,038, filed on Apr. 3, 2017.

(51) Int. Cl.
*H04N 5/232* (2006.01)
*H04N 5/262* (2006.01)
(Continued)

(52) U.S. Cl.
CPC ........... *H04N 5/23296* (2013.01); *G06T 3/40* (2013.01); *G06T 5/50* (2013.01); *H04N 5/22541* (2018.08);
(Continued)

(58) Field of Classification Search
CPC ........... H04N 5/23296; H04N 5/22541; H04N 5/232; H04N 5/23212; H04N 5/2628; G06T 3/40; G06T 5/50; G06T 2207/10052
See application file for complete search history.

(56) References Cited

U.S. PATENT DOCUMENTS

| 725,567 A | 4/1903 | Ives |
|---|---|---|
| 4,383,170 A | 5/1983 | Takagi et al. |
| | (Continued) | |

FOREIGN PATENT DOCUMENTS

| CN | 101226292 | 7/2008 |
|---|---|---|
| CN | 101309359 | 11/2008 |
| | (Continued) | |

OTHER PUBLICATIONS

Georgiev, T., et al., "Suppersolution with Plenoptic 2.0 Cameras," Optical Society of America 2009; pp. 1-3.
(Continued)

*Primary Examiner* — Twyler L Haskins
*Assistant Examiner* — Fayez Bhuiyan

(57) ABSTRACT

A sensor is configured to acquire a light field by imaging a scene. A processor is configured to determine four-dimensional (4D) coordinates of points in a light field and generate dollied coordinates from the 4D coordinates based on a dolly transform and a dolly parameter. The processor is also configured to project rays associated with the dollied coordinates from the light field onto corresponding points in an output raster. In some cases, the processor applies an aperture function to filter the rays in the coordinate system of the dollied coordinates. The aperture function has a first value in a first region of an aperture plane and the aperture value has a second value in a second region of the aperture plane. Rays passing through the first region are accepted by the aperture function and rays passing through the second region are rejected.

14 Claims, 10 Drawing Sheets

(51) Int. Cl.
*G06T 3/40* (2006.01)
*G06T 5/50* (2006.01)
*H04N 5/225* (2006.01)

(52) U.S. Cl.
CPC ......... *H04N 5/232* (2013.01); *H04N 5/23212* (2013.01); *H04N 5/2628* (2013.01); *G06T 2207/10052* (2013.01)

(56) References Cited

U.S. PATENT DOCUMENTS

| | | |
|---|---|---|
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,077,810 A | 12/1991 | D'Luna |
| 5,157,465 A | 10/1992 | Kronberg |
| 5,251,019 A | 10/1993 | Moorman et al. |
| 5,282,045 A | 1/1994 | Mimura et al. |
| 5,499,069 A | 3/1996 | Griffith |
| 5,572,034 A | 11/1996 | Karellas |
| 5,610,390 A | 3/1997 | Miyano |
| 5,729,471 A | 3/1998 | Jain et al. |
| 5,748,371 A | 5/1998 | Cathey, Jr. et al. |
| 5,757,423 A | 5/1998 | Tanaka et al. |
| 5,818,525 A | 10/1998 | Elabd |
| 5,835,267 A | 11/1998 | Mason et al. |
| 5,907,619 A | 5/1999 | Davis |
| 5,949,433 A | 9/1999 | Klotz |
| 5,974,215 A | 10/1999 | Bilbro et al. |
| 6,005,936 A | 12/1999 | Shimizu et al. |
| 6,021,241 A | 2/2000 | Bilbro et al. |
| 6,023,523 A | 2/2000 | Cohen et al. |
| 6,028,606 A | 2/2000 | Kolb et al. |
| 6,034,690 A | 3/2000 | Gallery et al. |
| 6,061,083 A | 5/2000 | Aritake et al. |
| 6,061,400 A | 5/2000 | Pearlstein et al. |
| 6,069,565 A | 5/2000 | Stern et al. |
| 6,075,889 A | 6/2000 | Hamilton, Jr. et al. |
| 6,084,979 A | 7/2000 | Kanade et al. |
| 6,091,860 A | 7/2000 | Dimitri |
| 6,097,394 A | 8/2000 | Levoy et al. |
| 6,115,556 A | 9/2000 | Reddington |
| 6,137,100 A | 10/2000 | Fossum et al. |
| 6,169,285 B1 | 1/2001 | Pertrillo et al. |
| 6,201,899 B1 | 3/2001 | Bergen |
| 6,221,687 B1 | 4/2001 | Abramovich |
| 6,320,979 B1 | 11/2001 | Melen |
| 6,424,351 B1 | 7/2002 | Bishop et al. |
| 6,448,544 B1 | 9/2002 | Stanton et al. |
| 6,466,207 B1 | 10/2002 | Gortler et al. |
| 6,476,805 B1 | 11/2002 | Shum et al. |
| 6,479,827 B1 | 11/2002 | Hamamoto et al. |
| 6,483,535 B1 | 11/2002 | Tamburrino et al. |
| 6,529,265 B1 | 3/2003 | Henningsen |
| 6,577,342 B1 | 6/2003 | Webster |
| 6,587,147 B1 | 7/2003 | Li |
| 6,597,859 B1 | 7/2003 | Leinhardt et al. |
| 6,606,099 B2 | 8/2003 | Yamada |
| 6,658,168 B1 | 12/2003 | Kim |
| 6,674,430 B1 | 1/2004 | Kaufman et al. |
| 6,687,419 B1 | 2/2004 | Atkin |
| 6,768,980 B1 | 7/2004 | Meyer et al. |
| 6,785,667 B2 | 8/2004 | Orbanes et al. |
| 6,833,865 B1 | 12/2004 | Fuller et al. |
| 6,842,297 B2 | 1/2005 | Dowski, Jr. et al. |
| 6,900,841 B1 | 5/2005 | Mihara |
| 6,924,841 B2 | 8/2005 | Jones |
| 6,927,922 B2 | 8/2005 | George et al. |
| 7,003,061 B2 | 2/2006 | Wiensky |
| 7,015,954 B1 | 3/2006 | Foote et al. |
| 7,025,515 B2 | 4/2006 | Woods |
| 7,034,866 B1 | 4/2006 | Colmenarez et al. |
| 7,079,698 B2 | 7/2006 | Kobayashi |
| 7,102,666 B2 | 9/2006 | Kanade et al. |
| 7,164,807 B2 | 1/2007 | Morton |
| 7,206,022 B2 | 4/2007 | Miller et al. |
| 7,239,345 B1 | 7/2007 | Rogina |
| 7,286,295 B1 | 10/2007 | Sweatt et al. |
| 7,304,670 B1 | 12/2007 | Hussey et al. |
| 7,329,856 B2 | 2/2008 | Ma et al. |
| 7,336,430 B2 | 2/2008 | George |
| 7,417,670 B1 | 8/2008 | Linzer et al. |
| 7,469,381 B2 | 12/2008 | Ording |
| 7,477,304 B2 | 1/2009 | Hu |
| 7,587,109 B1 | 9/2009 | Reininger |
| 7,620,309 B2 | 11/2009 | Georgiev |
| 7,623,726 B1 | 11/2009 | Georgiev |
| 7,633,513 B2 | 12/2009 | Kondo et al. |
| 7,683,951 B2 | 3/2010 | Aotsuka |
| 7,687,757 B1 | 3/2010 | Tseng et al. |
| 7,723,662 B2 | 5/2010 | Levoy et al. |
| 7,724,952 B2 | 5/2010 | Shum et al. |
| 7,748,022 B1 | 6/2010 | Frazier |
| 7,847,825 B2 | 12/2010 | Aoki et al. |
| 7,936,377 B2 | 5/2011 | Friedhoff et al. |
| 7,936,392 B2 | 5/2011 | Ng et al. |
| 7,941,634 B2 | 5/2011 | Georgi |
| 7,945,653 B2 | 5/2011 | Zuckerberg et al. |
| 7,949,252 B1 | 5/2011 | Georgiev |
| 7,982,776 B2 | 7/2011 | Dunki-Jacobs et al. |
| 8,013,904 B2 | 9/2011 | Tan et al. |
| 8,085,391 B2 | 12/2011 | Machida et al. |
| 8,106,856 B2 | 1/2012 | Matas et al. |
| 8,115,814 B2 | 2/2012 | Iwase et al. |
| 8,155,456 B2 | 4/2012 | Babacan |
| 8,155,478 B2 | 4/2012 | Vitsnudel et al. |
| 8,189,089 B1 | 5/2012 | Georgiev et al. |
| 8,228,417 B1 | 7/2012 | Georgiev et al. |
| 8,248,515 B2 | 8/2012 | Ng et al. |
| 8,259,198 B2 | 9/2012 | Cote et al. |
| 8,264,546 B2 | 9/2012 | Witt |
| 8,279,325 B2 | 10/2012 | Pitts et al. |
| 8,289,440 B2 | 10/2012 | Knight et al. |
| 8,290,358 B1 | 10/2012 | Georgiev |
| 8,310,554 B2 | 11/2012 | Aggarwal et al. |
| 8,315,476 B1 | 11/2012 | Georgiev et al. |
| 8,345,144 B1 | 1/2013 | Georgiev et al. |
| 8,400,533 B1 | 3/2013 | Szedo |
| 8,400,555 B1 | 3/2013 | Georgiev et al. |
| 8,411,948 B2 | 4/2013 | Rother |
| 8,427,548 B2 | 4/2013 | Lim |
| 8,442,397 B2 | 5/2013 | Kang et al. |
| 8,446,516 B2 | 5/2013 | Pitts et al. |
| 8,494,304 B2 | 7/2013 | Venable et al. |
| 8,531,581 B2 | 9/2013 | Shroff |
| 8,542,933 B2 | 9/2013 | Venkataraman et al. |
| 8,559,705 B2 | 10/2013 | Ng |
| 8,570,426 B2 | 10/2013 | Pitts et al. |
| 8,577,216 B2 | 11/2013 | Li et al. |
| 8,581,998 B2 | 11/2013 | Ohno |
| 8,589,374 B2 | 11/2013 | Chaudhri |
| 8,593,564 B2 | 11/2013 | Border et al. |
| 8,605,199 B2 | 12/2013 | Imai |
| 8,614,764 B2 | 12/2013 | Pitts et al. |
| 8,619,082 B1 | 12/2013 | Ciurea et al. |
| 8,629,930 B2 | 1/2014 | Brueckner et al. |
| 8,665,440 B1 | 3/2014 | Kompaniets et al. |
| 8,675,073 B2 | 3/2014 | Aagaard et al. |
| 8,724,014 B2 | 5/2014 | Ng et al. |
| 8,736,710 B2 | 5/2014 | Spielberg |
| 8,736,751 B2 | 5/2014 | Yun |
| 8,749,620 B1 | 6/2014 | Pitts et al. |
| 8,750,509 B2 | 6/2014 | Renkis |
| 8,754,829 B2 | 6/2014 | Lapstun |
| 8,760,566 B2 | 6/2014 | Pitts et al. |
| 8,768,102 B1 | 7/2014 | Ng et al. |
| 8,797,321 B1 | 8/2014 | Bertolami et al. |
| 8,811,769 B1 | 8/2014 | Pitts et al. |
| 8,831,377 B2 | 9/2014 | Pitts et al. |
| 8,848,970 B2 | 9/2014 | Aller et al. |
| 8,860,856 B2 | 10/2014 | Wetzstein et al. |
| 8,879,901 B2 | 11/2014 | Caldwell et al. |
| 8,903,232 B1 | 12/2014 | Caldwell |

(56) References Cited

U.S. PATENT DOCUMENTS

| | | |
|---|---|---|
| 8,908,058 B2 | 12/2014 | Akeley et al. |
| 8,948,545 B2 | 2/2015 | Akeley et al. |
| 8,953,882 B2 | 2/2015 | Lim et al. |
| 8,971,625 B2 | 3/2015 | Pitts et al. |
| 8,976,288 B2 | 3/2015 | Ng et al. |
| 8,988,317 B1 | 3/2015 | Liang et al. |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,172,853 B2 | 10/2015 | Pitts et al. |
| 9,184,199 B2 | 11/2015 | Pitts et al. |
| 9,201,193 B1 | 12/2015 | Smith |
| 9,210,391 B1 | 12/2015 | Mills |
| 9,214,013 B2 | 12/2015 | Venkataraman et al. |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | El-Ghoroury et al. |
| 9,774,800 B2 | 9/2017 | El-Ghoroury et al. |
| 9,858,649 B2 | 1/2018 | Liang et al. |
| 9,866,810 B2 | 1/2018 | Knight et al. |
| 9,900,510 B1 | 2/2018 | Karafin et al. |
| 9,979,909 B2 | 5/2018 | Kuang et al. |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Nister |
| 2002/0061131 A1 | 5/2002 | Sawhney |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0043270 A1 | 3/2003 | Rafey |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2004/0002179 A1 | 1/2004 | Barton et al. |
| 2004/0012688 A1 | 1/2004 | Tinnerinno et al. |
| 2004/0012689 A1 | 1/2004 | Tinnerinno et al. |
| 2004/0101166 A1 | 5/2004 | Williams et al. |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0162540 A1 | 7/2005 | Yata |
| 2005/0212918 A1 | 9/2005 | Serra et al. |
| 2005/0276441 A1 | 12/2005 | Debevec |
| 2006/0008265 A1 | 1/2006 | Ito |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0250322 A1 | 11/2006 | Hall et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg et al. |
| 2007/0273795 A1 | 11/2007 | Jaynes |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Horie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0109280 A1 | 4/2009 | Gotsman |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0207233 A1 | 8/2009 | Mauchly et al. |
| 2009/0273843 A1 | 11/2009 | Raskar et al. |
| 2009/0295829 A1 | 12/2009 | Georgiev et al. |
| 2009/0309973 A1 | 12/2009 | Kogane |
| 2009/0309975 A1 | 12/2009 | Gordon |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0021001 A1 | 1/2010 | Honsinger et al. |
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |

(56) References Cited

U.S. PATENT DOCUMENTS

| | | |
|---|---|---|
| 2010/0123784 A1 | 5/2010 | Ding et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277617 A1 | 11/2010 | Hollinger |
| 2010/0277629 A1 | 11/2010 | Tanaka |
| 2010/0303288 A1 | 12/2010 | Malone |
| 2010/0328485 A1 | 12/2010 | Imamura et al. |
| 2011/0001858 A1 | 1/2011 | Shintani |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0032338 A1 | 2/2011 | Raveendran et al. |
| 2011/0050864 A1 | 3/2011 | Bond |
| 2011/0050909 A1 | 3/2011 | Ellenby |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0091192 A1 | 4/2011 | Iwane |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0249341 A1 | 10/2011 | DiFrancesco et al. |
| 2011/0261164 A1 | 10/2011 | Olesen et al. |
| 2011/0261205 A1 | 10/2011 | Sun |
| 2011/0267263 A1 | 11/2011 | Hinckley |
| 2011/0267348 A1 | 11/2011 | Lin |
| 2011/0273466 A1 | 11/2011 | Imai et al. |
| 2011/0279479 A1 | 11/2011 | Rodriguez |
| 2011/0133649 A1 | 12/2011 | Bales et al. |
| 2011/0292258 A1 | 12/2011 | Adler |
| 2011/0293179 A1 | 12/2011 | Dikmen |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0050562 A1 | 3/2012 | Perwass et al. |
| 2012/0056889 A1 | 3/2012 | Carter et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto et al. |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0271115 A1 | 10/2012 | Buerk |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2013/0002902 A1 | 1/2013 | Ito |
| 2013/0002936 A1 | 1/2013 | Hirama et al. |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0121577 A1 | 5/2013 | Wang |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0129213 A1 | 5/2013 | Shectman |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0243391 A1 | 9/2013 | Park et al. |
| 2013/0258451 A1 | 10/2013 | El-Ghoroury et al. |
| 2013/0262511 A1 | 10/2013 | Kuffner et al. |
| 2013/0286236 A1 | 10/2013 | Mankowski |
| 2013/0321574 A1 | 12/2013 | Zhang et al. |
| 2013/0321581 A1 | 12/2013 | El-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0168484 A1 | 6/2014 | Suzuki |
| 2014/0176540 A1 | 6/2014 | Tosic et al. |
| 2014/0176592 A1 | 6/2014 | Wilburn et al. |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1 | 8/2014 | Geiss et al. |
| 2014/0226038 A1 | 8/2014 | Kimura |
| 2014/0240463 A1 | 8/2014 | Pitts et al. |
| 2014/0240578 A1 | 8/2014 | Fishman et al. |
| 2014/0245367 A1 | 8/2014 | Sasaki |
| 2014/0267243 A1 | 9/2014 | Venkataraman et al. |

(56) References Cited

U.S. PATENT DOCUMENTS

| | | |
|---|---|---|
| 2014/0267639 A1 | 9/2014 | Tatsuta |
| 2014/0300646 A1* | 10/2014 | Pitts .......................... G06T 3/40 345/660 |
| 2014/0300753 A1 | 10/2014 | Yin |
| 2014/0313350 A1 | 10/2014 | Keelan |
| 2014/0313375 A1 | 10/2014 | Milnar |
| 2014/0333787 A1 | 11/2014 | Venkataraman |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1 | 12/2014 | Strandemar et al. |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0130986 A1 | 5/2015 | Ohnishi |
| 2015/0193937 A1 | 7/2015 | Georgiev et al. |
| 2015/0206340 A1 | 7/2015 | Munkberg et al. |
| 2015/0207990 A1 | 7/2015 | Ford et al. |
| 2015/0237273 A1 | 8/2015 | Sawadaishi |
| 2015/0104101 A1 | 10/2015 | Bryant et al. |
| 2015/0288867 A1 | 10/2015 | Kajimura |
| 2015/0304544 A1 | 10/2015 | Eguchi |
| 2015/0310592 A1 | 10/2015 | Kano |
| 2015/0312553 A1 | 10/2015 | Ng et al. |
| 2015/0312593 A1 | 10/2015 | Akeley et al. |
| 2015/0346832 A1 | 12/2015 | Cole et al. |
| 2015/0370011 A1 | 12/2015 | Ishihara |
| 2015/0370012 A1 | 12/2015 | Ishihara |
| 2015/0373279 A1 | 12/2015 | Osborne |
| 2016/0029017 A1 | 1/2016 | Liang |
| 2016/0065931 A1 | 3/2016 | Konieczny |
| 2016/0065947 A1 | 3/2016 | Cole et al. |
| 2016/0142615 A1 | 5/2016 | Liang |
| 2016/0155215 A1 | 6/2016 | Suzuki |
| 2016/0165206 A1 | 6/2016 | Huang et al. |
| 2016/0173844 A1 | 6/2016 | Knight et al. |
| 2016/0191823 A1 | 6/2016 | El-Ghoroury |
| 2016/0253837 A1 | 9/2016 | Zhu et al. |
| 2016/0269620 A1 | 9/2016 | Romanenko et al. |
| 2016/0307368 A1 | 10/2016 | Akeley |
| 2016/0307372 A1 | 10/2016 | Pitts et al. |
| 2016/0309065 A1 | 10/2016 | Karafin et al. |
| 2016/0353006 A1 | 12/2016 | Anderson |
| 2016/0353026 A1 | 12/2016 | Blonde et al. |
| 2016/0381348 A1 | 12/2016 | Hayasaka |
| 2017/0031146 A1 | 2/2017 | Zheng |
| 2017/0059305 A1 | 3/2017 | Nonn et al. |
| 2017/0067832 A1 | 3/2017 | Ferrara, Jr. et al. |
| 2017/0078578 A1 | 3/2017 | Sato |
| 2017/0094906 A1 | 3/2017 | Liang et al. |
| 2017/0134639 A1 | 5/2017 | Pitts et al. |
| 2017/0139131 A1 | 5/2017 | Karafin et al. |
| 2017/0221226 A1 | 8/2017 | Shen |
| 2017/0237971 A1 | 8/2017 | Pitts et al. |
| 2017/0243373 A1 | 8/2017 | Bevensee et al. |
| 2017/0244948 A1 | 8/2017 | Pang et al. |
| 2017/0256036 A1 | 9/2017 | Song et al. |
| 2017/0263012 A1 | 9/2017 | Sabater et al. |
| 2017/0302903 A1 | 10/2017 | Ng et al. |
| 2017/0358092 A1 | 12/2017 | Bleibel et al. |
| 2017/0365068 A1 | 12/2017 | Tan et al. |
| 2017/0374411 A1 | 12/2017 | Lederer et al. |
| 2018/0007253 A1 | 1/2018 | Abe |
| 2018/0012397 A1 | 1/2018 | Carothers |
| 2018/0020204 A1 | 1/2018 | Pang et al. |
| 2018/0024753 A1 | 1/2018 | Gewickey et al. |
| 2018/0033209 A1 | 2/2018 | Akeley et al. |
| 2018/0034134 A1 | 2/2018 | Pang et al. |
| 2018/0070066 A1 | 3/2018 | Knight et al. |
| 2018/0070067 A1 | 3/2018 | Knight et al. |
| 2018/0082405 A1 | 3/2018 | Liang |
| 2018/0089903 A1 | 3/2018 | Pang et al. |
| 2018/0097867 A1 | 4/2018 | Pang et al. |
| 2018/0158198 A1 | 6/2018 | Karnad |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 2006039486 | 4/2006 |
| WO | 2007092545 | 8/2007 |
| WO | 2007092581 | 8/2007 |
| WO | 2011010234 | 3/2011 |
| WO | 2011029209 | 3/2011 |
| WO | 2011081187 | 7/2011 |

OTHER PUBLICATIONS

Georgiev, T., et al., "Unified Frequency Domain Analysis of Lightfield Cameras" (2008).

Georgiev, T., et al., Plenoptic Camera 2.0 (2008).

Girod, B., "Mobile Visual Search", IEEE Signal Processing Magazine, Jul. 2011.

Gortler et al., "The lumigraph" SIGGRAPH 96, pp. 43-54.

Groen et al., "A Comparison of Different Focus Functions for Use in Autofocus Algorithms," Cytometry 6:81-91, 1985.

Haeberli, Paul "A Multifocus Method for Controlling Depth of Field" GRAPHICA Obscura, 1994, pp. 1-3.

Heide, F. et al., "High-Quality Computational Imaging Through Simple Lenses," ACM Transactions on Graphics, SIGGRAPH 2013; pp. 1-7.

Heidelberg Collaboratory for Image Processing, "Consistent Depth Estimation in a 4D Light Field," May 2013.

Hirigoyen, F., et al., "1.1 um Backside Imager vs. Frontside Image: an optics-dedicated FDTD approach", IEEE 2009 International Image Sensor Workshop.

Huang, Fu-Chung et al., "Eyeglasses-free Display: Towards Correcting Visual Aberrations with Computational Light Field Displays," ACM Transaction on Graphics, Aug. 2014, pp. 1-12.

Isaksen, A., et al., "Dynamically Reparameterized Light Fields," SIGGRAPH 2000, pp. 297-306.

Ives H., "Optical properties of a Lippman lenticulated sheet," J. Opt. Soc. Am. 21, 171 (1931).

Ives, Fl "Parallax Panoramagrams Made with a Large Diameter Lens", Journal of the Optical Society of America; 1930.

Jackson et al., "Selection of a Convolution Function for Fourier Inversion Using Gridding" IEEE Transactions on Medical Imaging, Sep. 1991, vol. 10, No. 3, pp. 473-478.

Kautz, J., et al., "Fast arbitrary BRDF shading for low-frequency lighting using spherical harmonics", in Eurographic Rendering Workshop 2002, 291-296.

Koltun, et al., "Virtual Occluders: An Efficient Interediate PVS Representation", Rendering Techniques 2000: Proc. 11th Eurographics Workshop Rendering, pp. 59-70, Jun. 2000.

Kopf, J., et al., Deep Photo: Model-Based Photograph Enhancement and Viewing, SIGGRAPH Asia 2008.

Lehtinen, J., et al. "Matrix radiance transfer", in Symposium on Interactive 3D Graphics, 59-64, 2003.

Lesser, Michael, "Back-Side Illumination", 2009.

Levin, A., et al., "Image and Depth from a Conventional Camera with a Coded Aperture", SIGGRAPH 2007, pp. 1-9.

Levoy et al.,"Light Field Rendering" SIGGRAPH 96 Proceeding, 1996. pp. 31-42.

Levoy, "Light Fields and Computational Imaging" IEEE Computer Society, Aug. 2006, pp. 46-55.

Levoy, M. "Light Field Photography and Videography," Oct. 18, 2005.

Levoy, M. "Stanford Light Field Microscope Project," 2008; http://graphics.stanford.edu/projects/lfmicroscope/, 4 pages.

Levoy, M., "Autofocus: Contrast Detection", http://graphics.stanford.edu/courses/cs178/applets/autofocusPD.html, pp. 1-3, 2010.

(56) References Cited

OTHER PUBLICATIONS

Levoy, M., "Autofocus: Phase Detection", http://graphics.stanford.edu/courses/cs178/applets/autofocusPD.html, pp. 1-3, 2010.
Levoy, M., et al., "Light Field Microscopy," ACM Transactions on Graphics, vol. 25, No. 3, Proceedings SIGGRAPH 2006.
Liang, Chia-Kai, et al., "Programmable Aperture Photography: Multiplexed Light Field Acquisition", ACM SIGGRAPH, 2008.
Lippmann, "Reversible Prints", Communication at the French Society of Physics, Journal of Physics, 7, 4, Mar. 1908, pp. 821-825.
Lumsdaine et al., "Full Resolution Lighffield Rendering" Adobe Technical Report Jan. 2008, pp. 1-12.
Maeda, Y. et al., "A CMOS Image Sensor with Pseudorandom Pixel Placement for Clear Imaging," 2009 International Symposium on Intelligent Signal Processing and Communication Systems, Dec. 2009.
Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.
Mallat, Stephane, "A Wavelet Tour of Signal Processing", Academic Press 1998.
Malzbender, et al., "Polynomial Texture Maps", Proceedings SIGGRAPH 2001.
Marshall, Richard J. et al., "Improving Depth Estimation from a Plenoptic Camera by Patterned Illumination," Proc. of SPIE, vol. 9528, 2015, pp. 1-6.
Masselus, Vincent, et al., "Relighting with 4D Incident Light Fields", SIGGRAPH 2003.
Meynants, G., et al., "Pixel Binning in CMOS Image Sensors," Frontiers in Electronic Imaging Conference, 2009.
Moreno-Noguer, F. et al., "Active Refocusing of Images and Videos," ACM Transactions on Graphics, Aug. 2007; pp. 1-9.
Munkberg, J. et al., "Layered Reconstruction for Defocus and Motion Blur" EGSR 2014, pp. 1-12.
Naemura et al., "3-D Computer Graphics based on Integral Photography" Optics Express, Feb. 12, 2001. vol. 8, No. 2, pp. 255-262.
Nakamura, J., "Image Sensors and Signal Processing for Digital Still Cameras" (Optical Science and Engineering), 2005.
National Instruments, "Anatomy of a Camera," pp. 1-5, Sep. 6, 2006.
Nayar, Shree, et al., "Shape from Focus", IEEE Transactions on Pattern Analysis and Machine Intelligence, vol. 16, No. 8, pp. 824-831, Aug. 1994.
Ng, R., et al. "Light Field Photography with a Hand-held Plenoptic Camera," Stanford Technical Report, CSTR 2005-2, 2005.
Ng, R., et al., "All-Frequency Shadows Using Non-linear Wavelet Lighting Approximation. ACM Transactions on Graphics," ACM Transactions on Graphics; Proceedings of SIGGRAPH 2003.
Ng, R., et al., "Triple Product Wavelet Integrals for All-Frequency Relighting", ACM Transactions on Graphics (Proceedings of SIGGRAPH 2004).
Ng, Yi-Ren, "Digital Light Field Photography," Doctoral Thesis, Standford University, Jun. 2006; 203 pages.
Ng., R., "Fourier Slice Photography," ACM Transactions on Graphics, Proceedings of SIGGRAPH 2005, vol. 24, No. 3, 2005, pp. 735-744.
Nguyen, Hubert. "Practical Post-Process Depth of Field." GPU Gems 3. Upper Saddle River, NJ: Addison-Wesley, 2008.
Nimeroff, J., et al., "Efficient rendering of naturally illuminatied environments" in Fifth Eurographics Workshop on Rendering, 359-373, 1994.
Nokia, "City Lens", May 2012.
Ogden, J., "Pyramid-Based Computer Graphics", 1985.
Okano et al., "Three-dimensional video system based on integral photography" Optical Engineering, Jun. 1999. vol. 38, No. 6, pp. 1072-1077.
Orzan, Alexandrina, et al., "Diffusion Curves: A Vector Representation for Smooth-Shaded Images," ACM Transactions on Graphics—Proceedings of SIGGRAPH 2008; vol. 27; 2008.
Pain, B., "Back-Side Illumination Technology for SOI-CMOS Image Sensors", 2009.
Perez, Patrick et al., "Poisson Image Editing," ACM Transactions on Graphics—Proceedings of ACM SIGGRAPH 2003; vol. 22, Issue 3; Jul. 2003; pp. 313-318.
Petschnigg, George, et al., "Digial Photography with Flash and No-Flash Image Pairs", SIGGRAPH 2004.
Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.
Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raskar, Ramesh et al., "Non-photorealistic Camera: Depth Edge Detection and Stylized Rendering using Multi-Flash Imaging", SIGGRAPH 2004.
Raytrix, "Raytrix Lightfield Camera," Raytrix GmbH, Germany 2012, pp. 1-35.
Roper Scientific, Germany "Fiber Optics," 2012.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shade, Jonathan, et al., "Layered Depth Images", SIGGRAPH 98, pp. 1-2.
Shreiner, OpenGL Programming Guide, 7th edition, Chapter 8, 2010.
Simpleviewer, "Tiltview", http://simpleviewer.net/tiltviewer. Retrieved Jan. 2013.
Skodras, A, et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", ACM Transactions on Graphics (SIGGRAPH Proceedings), 2006.
Sokolov, "Autostereoscopy and Integral Photography by Professor Lippmann's Method", 1911, pp. 23-29.
Sony Corp, "Interchangeable Lens Digital Camera Handbook", 2011.
Sony, Sony's First Curved Sensor Photo: http://www.engadget.com; Jul. 2014.
Stensvold, M., "Hybrid AF: A New Approach to Autofocus Is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Tao, Michael, et al., "Depth from Combining Defocus and Correspondence Using Light-Field Cameras", Dec. 2013.
Techcrunch, "Coolinis", Retrieved Jan. 2013.
Teo, P., et al., "Efficient linear rendering for interactive light design", Tech. Rep. STAN-CS-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.

(56) References Cited

OTHER PUBLICATIONS

Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate.
Wanner, S. et al., "Globally Consistent Depth Labeling of 4D Light Fields," IEEE Conference on Computer Vision and Pattern Recognition, 2012.
Wanner, S. et al., "Variational Light Field Analysis for Disparity Estimation and Super-Resolution," IEEE Transacations on Pattern Analysis and Machine Intellegence, 2013.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
U.S. Appl. No. 15/967,076, filed Apr. 30, 2018 listing Jiantao Kuang et al. as inventors, entitled "Automatic Lens Flare Detection and Correction for Light-Field Images".
U.S. Appl. No. 15/666,298, filed Aug. 1, 2017 listing Yonggang Ha et al. as inventors, entitled "Focal Reducer With Controlled Optical Properties for Interchangeable Lens Light-Field Camera".
U.S. Appl. No. 15/590,808, filed May 9, 2017 listing Alex Song et al. as inventors, entitled "Adaptive Control for Immersive Experience Delivery".
U.S. Appl. No. 15/864,938, filed Jan. 8, 2018 listing Jon Karafin et al. as inventors, entitled "Motion Blur for Light-Field Images".
U.S. Appl. No. 15/703,553, filed Sep. 13, 2017 listing Jon Karafin et al. as inventors, entitled "4D Camera Tracking and Optical Stabilization".
U.S. Appl. No. 15/590,841, filed May 9, 2017 listing Kurt Akeley et al. as inventors, entitled "Vantage Generation and Interactive Playback".
U.S. Appl. No. 15/590,951, filed May 9, 2017 listing Alex Song et al. as inventors, entitled "Wedge-Based Light-Field Video Capture".
U.S. Appl. No. 15/874,723, filed Jan. 18, 2018 listing Mark Weir et al. as inventors, entitled "Multi-Camera Navigation Interface".
U.S. Appl. No. 15/897,994, filed Feb. 15, 2018 listing Trevor Carothers et al. as inventors, entitled "Generation of Virtual Reality With 6 Degrees of Freesom From Limited Viewer Data".
U.S. Appl. No. 15/605,037, filed May 25, 2017 listing Zejing Wang et al. as inventors, entitled "Multi-View Back-Projection to a Light-Field".
U.S. Appl. No. 15/897,836, filed Feb. 15, 2018 listing Francois Bleibel et al. as inventors, entitled "Multi-View Contour Tracking".
U.S. Appl. No. 15/897,942, filed Feb. 15, 2018 listing Francois Bleibel et al. as inventors, entitled "Multi-View Contour Tracking With Grabcut".
Adelsberger, R. et al., "Spatially Adaptive Photographic Flash," ETH Zurich, Department of Computer Science, Technical Report 612, 2008, pp. 1-12.
Adelson et al., "Single Lens Stereo with a Plenoptic Camera" IEEE Translation on Pattern Analysis and Machine Intelligence, Feb. 1992. vol. 14, No. 2, pp. 99-106.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe Systems Inc, "XMP Specification", Sep. 2005.
Adobe, "Photoshop CS6 / in depth: Digital Negative (DNG)", http://www.adobe.com/products/photoshop/extend.displayTab2html. Retrieved Jan. 2013.
Agarwala, A., et al., "Interactive Digital Photomontage," ACM Transactions on Graphics, Proceedings of SIGGRAPH 2004, vol. 32, No. 3, 2004.
Andreas Observatory, Spectrograph Manual: IV. Flat-Field Correction, Jul. 2006.
Apple, "Apple iPad: Photo Features on the iPad", Retrieved Jan. 2013.
Bae, S., et al., "Defocus Magnification", Computer Graphics Forum, vol. 26, Issue 3 (Proc. of Eurographics 2007), pp. 1-9.
Belhumeur, Peter et al., "The Bas-Relief Ambiguity", International Journal of Computer Vision, 1997, pp. 1060-1066.
Belhumeur, Peter, et al., "The Bas-Relief Ambiguity", International Journal of Computer Vision, 1999, pp. 33-44, revised version.
Bhat, P. et al. "GradientShop: A Gradient-Domain Optimization Framework for Image and Video Filtering," SIGGRAPH 2010; 14 pages.
Bolles, R., et al., "Epipolar-Plane Image Analysis: An Approach to Determining Structure from Motion", International Journal of Computer Vision, 1, 7-55 (1987).
Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et al., "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al, "A Lighting Reproduction Approach to Live-Action Compoisting" Proceedings SIGGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.
Dorsey, J., et al., "Design and simulation of opera light and projection effects", in Computer Graphics (Proceedings of SIGGRAPH 91), vol. 25, 41-50.
Dorsey, J., et al., "Interactive design of complex time dependent lighting", IEEE Computer Graphics and Applications 15, 2 (Mar. 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.
Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.

(56) References Cited

OTHER PUBLICATIONS

Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
Wikipedia—Data overlay techniques for real-time visual feed. For example, heads-up displays: http://en.wikipedia.org/wiki/Head-up_display. Retrieved Jan. 2013.
Wikipedia—Exchangeable image file format: http://en.wikipedia.org/wiki/Exchangeable_image_file_format. Retrieved Jan. 2013.
Wikipedia—Expeed: http://en.wikipedia.org/wiki/EXPEED. Retrieved Jan. 15, 2014.
Wikipedia—Extensible Metadata Platform: http://en.wikipedia.org/wiki/Extensible_Metadata_Platform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.org/wiki/Lazy_loading. Retrieved Jan. 2013.
Wikipedia—Methods of Variable Bitrate Encoding: http://en.wikipedia.org/wiki/Variable_bitrate#Methods_of_VBR_encoding. Retrieved Jan. 2013.
Wikipedia—Portable Network Graphics format: http://en.wikipedia.org/wiki/Portable_Network_Graphics. Retrieved Jan. 2013.
Wikipedia—Unsharp Mask Technique: https://en.wikipedia.org/wiki/Unsharp_masking. Retrieved May 3, 2016.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using a Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al., "A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image Sensor Workshop, Bergen, Norway.
Xiao, Z. et al., "Aliasing Detection and Reduction in Plenoptic Imaging," IEEE Conference on Computer Vision and Pattern Recognition; 2014.
Xu, Xin et al., "Robust Automatic Focus Algorithm for Low Contrast Images Using a New Contrast Measure," Sensors 2011; 14 pages.
Zheng, C. et al., "Parallax Photography: Creating 3D Cinematic Effects from Stills", Proceedings of Graphic Interface, 2009.
Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.
Meng, J. et al., "An Approach on Hardware Design for Computational Photography Applications Based on Light Field Refocusing Algorithm," Nov. 18, 2007, 12 pages.

\* cited by examiner

GENERATING DOLLY ZOOM EFFECT USING LIGHT FIELD IMAGE DATA

CROSS-REFERENCE TO RELATED APPLICATIONS

The present application claims priority to U.S. Provisional Application Ser. No. 62/481,038 for "Generating Dolly Zoom Effect Using Light Field Image Data", filed on Apr. 3, 2017, which is incorporated herein by reference.

The present application is related to U.S. Utility application Ser. No. 14/311,592 for "Generating Dolly Zoom Effect Using Light Field Image Data", filed on Jun. 23, 2014, and issued on Mar. 3, 2015 as U.S. Pat. No. 8,971,625, which is incorporated herein by reference.

The present application is related to U.S. Utility application Ser. No. 15/162,426 for "Phase Detection Autofocus Using Subaperture Images", filed on May 23, 2016, which is incorporated herein by reference.

BACKGROUND

A light field camera, also known as a plenoptic camera, captures information about the light field emanating from a scene; that is, the intensity of light in a scene, and also the direction that the light rays are traveling in space. This contrasts with a conventional camera, which records only light intensity. One type of light field camera uses an array of micro-lenses placed in front of an otherwise conventional image sensor to sense intensity, color, and directional information. Multi-camera arrays are another type of light field camera.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items

DETAILED DESCRIPTION

Light fields can be manipulated to computationally reproduce various elements of image capture. One example is refocusing, which is equivalent to a virtual motion of the sensor plane. As described herein, virtual motion of the main lens plane is also possible, resulting in a dolly zoom effect in which a field-of-view is modified while a camel location moves towards or away from a subject in a manner that maintains a size of the subject in the frame. The dolly zoom effect was first used to portray James Stewart's fear of heights in the film Vertigo and is also well known for its use portraying Roy Scheider's anxiety in the film Jaws. Existing techniques to create a dolly zoom effect rely on the use of a depth map during 2D reconstruction. This requirement of an accurate depth map limits the robustness and applicability of the dolly-zoom effect.

Some embodiments of the light field are represented as a four-dimensional (4D) function that can be formed of two-dimensional (2D) images of a portion of a scene. The images represent views of the portions of the scene from different perspectives and frames are rendered from the point of view of the camera by sampling portions of the 2D images. For example, the coordinates (u, v, s, t) in the 4D function that represents the light field can be defined so that (u, v) represent coordinates within one of the camera images in the light field and (s, t) are coordinates of pixels within the camera image. Other definitions of the four coordinates of the 4D function that represents the light field can also be used.

According to various embodiments, a dolly zoom effect can be applied directly to the light field as a 4D transformation of some or all of the coordinates (u, v, s, t) that are used to define locations in the 4D light field. Using the techniques described herein, explicit depth calculations are not required, allowing the approach to be robustly applied to any light field. Furthermore, the techniques described herein do not require 2D reconstruction, thus allowing the full 4D light field to be dollied, for example for applications such as light field displays.

The described techniques can be implemented as a 4D transformation of the light field, and can easily be combined with other transformations, such as refocus, to create various effects.

Basic Dolly Zoom Equation

A simple version of the dolly zoom equation can be derived analogously to the refocus equation. For this derivation we reduce the light field to 2D without loss of generality.

Figure 1:
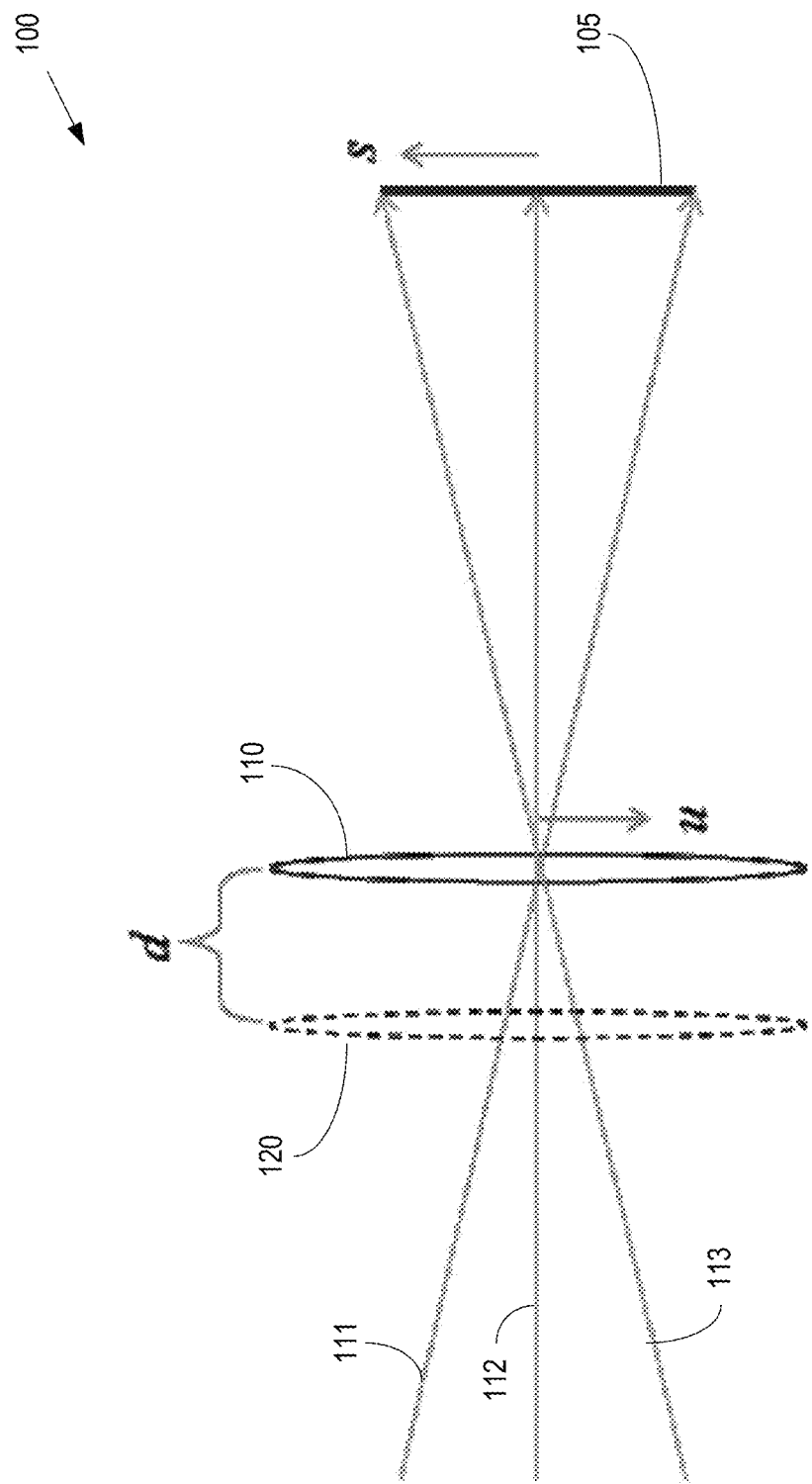
FIG. 1 illustrates an example of a dolly zoom effect according to some embodiments.

FIG. 1 illustrates an example 100 of a dolly zoom effect according to some embodiments. The s coordinate denotes position on the sensor 105, while the u coordinate denotes position on the aperture 110. Three rays 111, 112, 113 (collectively referred to herein as "the rays 111-113") are shown to pass through a location on the aperture 110 (not necessarily at the origin of the coordinate system used in the plane of the aperture 110) and hit the sensor 105.

A virtual aperture 120 is dollied a distance d relative to the plane of the aperture 110. From simple geometry it is apparent that the locations where the rays 111-113 intersect the virtual aperture 120 change proportionally to the slope of the rays 111-113 and d. Thus, the location where one of the rays 111-113 intersects the virtual aperture 120 is:

$$u' = u + k \cdot s \cdot d$$

where k is a normalization constant such that k*s is the slope of the ray.

In some embodiments, the values of k and d our combined into a single constant γ.

Thus, the light field transformation can be expressed as:

$$\begin{bmatrix} s' \\ u' \end{bmatrix} = \begin{bmatrix} 1 & 0 \\ \gamma & 1 \end{bmatrix} \begin{bmatrix} s \\ u \end{bmatrix}$$

or for the full 4D transform the light field is represented as:

$$\begin{bmatrix} s' \\ t' \\ u' \\ v' \end{bmatrix} = \begin{bmatrix} 1 & 0 & 0 & 0 \\ 0 & 1 & 0 & 0 \\ \gamma & 0 & 1 & 0 \\ 0 & \gamma & 0 & 1 \end{bmatrix} \begin{bmatrix} s \\ t \\ u \\ v \end{bmatrix}$$

Mathematically this transformation skews the light field along the uv plane. Intuitively, this skewing of the light field along the uv plane can be thought of as introducing a perspective shift that is proportional to the st location. An object's motion with a perspective shift is proportional to its depth, which can be interpreted as a depth dependent scaling. However, there is no need for the depth to be explicitly calculated.

Thinking of this dolly action as a depth-dependent scaling reveals that, for objects at the focus position (lambda 0), no scaling occurs. This can be thought of as a counter zoom being applied in order to keep apparent size the same for objects at the focus distance. Thus this transform simultaneously dollies and zooms the light field image.

Example Implementation

Figure 2:
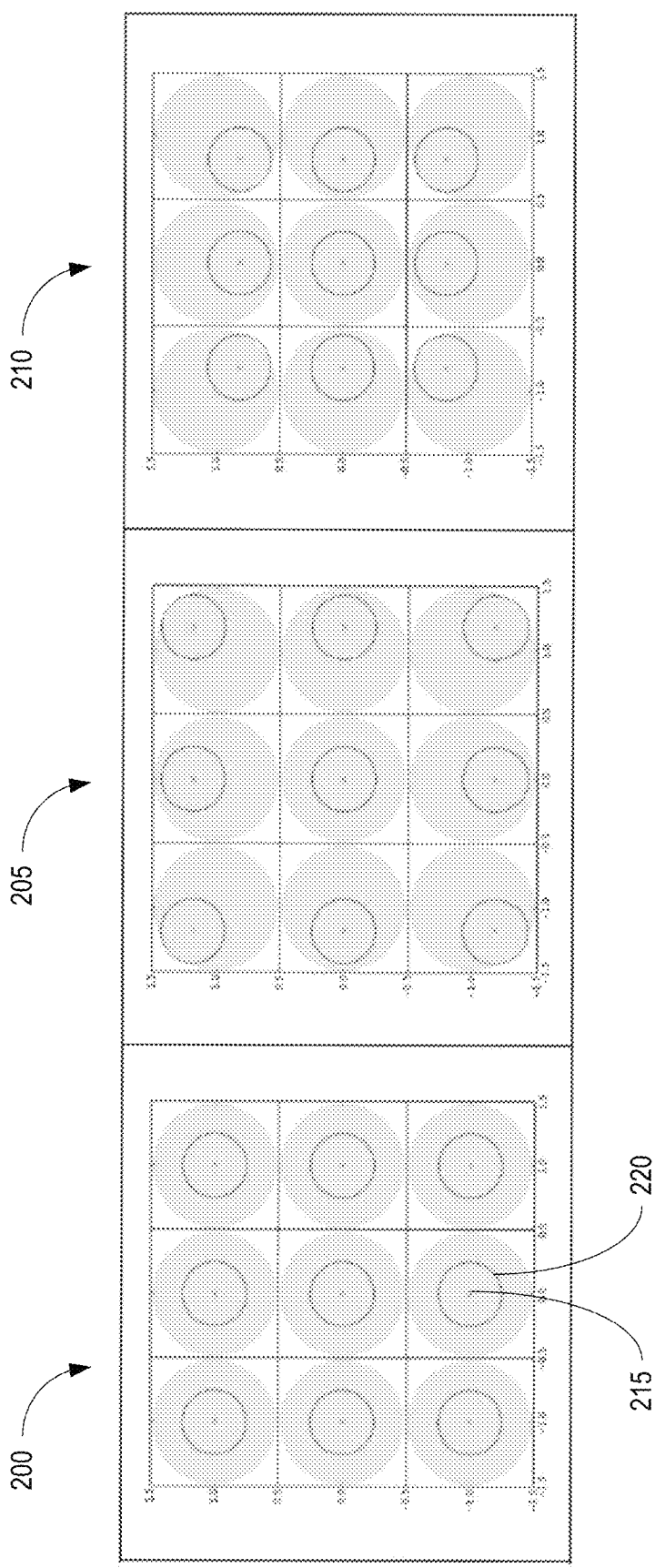
FIG. 2 illustrates an example of dolly-zoom as a coordinate transformation according to some embodiments.

In at least one embodiment, a dolly zoom effect is implemented using the light field projection method of 2D reconstruction as follows:

1. A 4D coordinate (s, t, u, v) is accessed or calculated for each point in the light field.
2. Given a dolly parameter $\gamma$, the dollied coordinate (s', t', u', v') is determined using the above equation, i.e. s'=s, t'=t, u'=u+$\gamma$s, v'=v+$\gamma$t
3. An aperture function $\alpha$(u, v) is accessed or generated. In the illustrated embodiment, the aperture function has a value of 1 where the aperture accepts rays and 0 where the aperture rejects rays. However, in other embodiments, the aperture function is implemented using other values or methods of representation.
   a. Some embodiments of a circular aperture with radius r have a value of the aperture function $\alpha$(u, v) equal to 1 when $u^2+v^2<r^2$ and 0 otherwise. The natural fully open aperture would have r=0.5
   b. The transformation of u' and v' effectively shifts the center of the aperture. A somewhat smaller aperture than full open can be used, so as to avoid the aperture function going out of bounds of the actual data, as shown in FIG. 2.
4. If the aperture function $\alpha$(u', v') accepts the ray, then the light field ray is projected to point (x, y)=(s', t') on the output raster.

FIG. 2 illustrates an example of dolly-zoom as a coordinate transformation according to some embodiments. From left to right, there is shown: the original light field 200, the light field with negative dolly-zoom 205, and the light field with positive dolly-zoom 210. The center (uv) location of each st cell changes.

In the example of FIG. 2, the above-described method is illustrated using a 3×3 light field. Each cell represents an (s, t) coordinate, while the coordinate within each cell represents (u, v). The central point 215 (only one indicated by a reference numeral in the interest of clarity) within each cell is the center of the (u, v) coordinate system. The gray areas represent valid data within the light field. The circle 220 (only one indicated by a reference numeral in the interest of clarity) represents the aperture function that is used in the above algorithm, which as noted above is smaller than the full size of the captured data.

The illustrations are examples only, and do not imply any particular method of light field capture. However, in some embodiments, a plenoptic camera with a 3×3 microlens array is used to capture the light field. In such a case, each microlens would be the (s, t) location, and within each microlens is a (u, v) coordinate system centered on the red x.

FIG. 2 illustrates an intuitive interpretation that dolly-zoom produces a spatially varying perspective shift. The virtual aperture, a.k.a. the aperture function, undergoes a perspective shift that is proportional to its (s, t) location, thus producing depth-dependent scaling in the 2D reconstructed image. This can be visualized as the scaling of the grid formed by the central points 215. As mentioned above, since the virtual aperture is being shifted, the virtual aperture is oriented or sized so that it overlaps with valid data. This also means a smaller virtual aperture will allow for more dolly-zoom.

Figure 3:
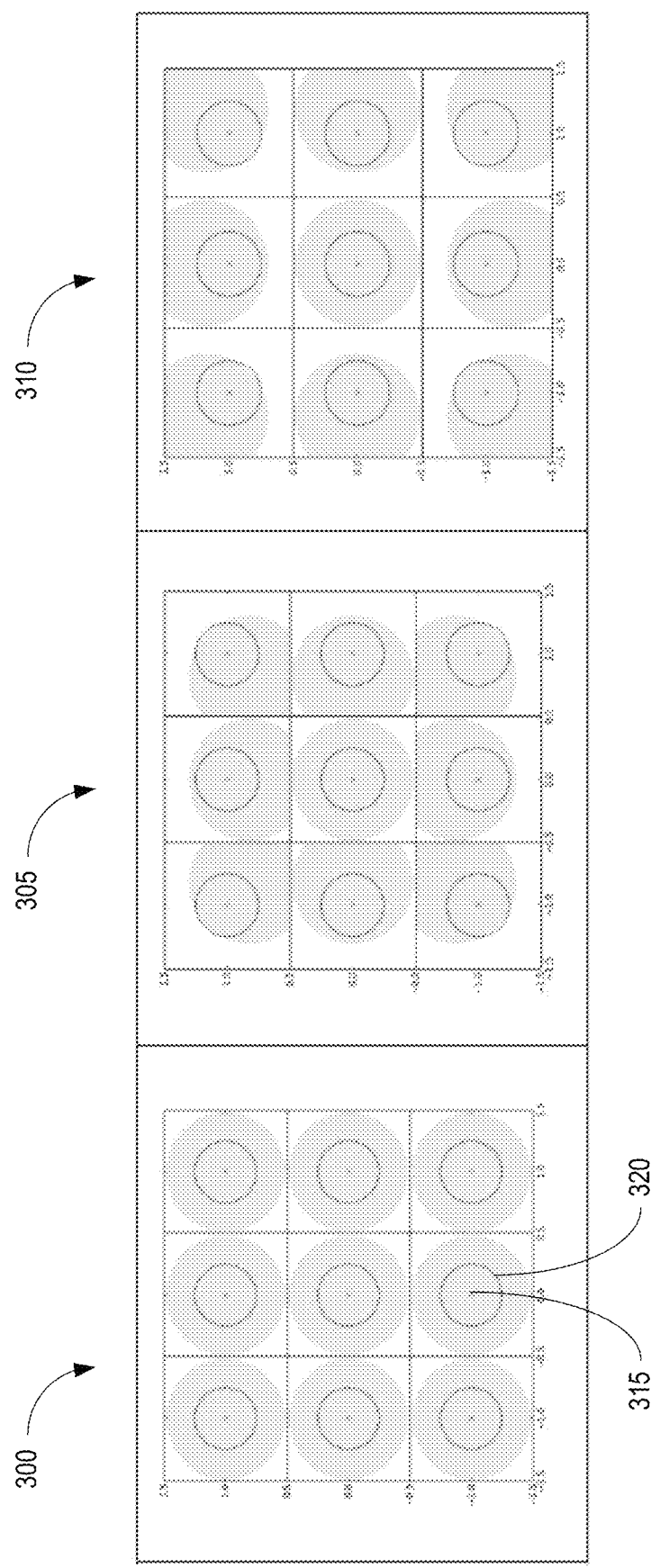
FIG. 3 is an illustration of a dolly-zoom as a transformation of the light field according to some embodiments.

FIG. 3 is an illustration of a dolly-zoom as a transformation of the light field according to some embodiments. From left to right, there is shown: the original light field 300, the light field with negative dolly-zoom 305, and the light field with positive dolly-zoom 310. The coordinate system is the same throughout, but the underlying light field is transformed. The central point 315 (only one indicated by a reference numeral in the interest of clarity) within each cell is the center of the (u, v) coordinate system. The gray areas represent valid data within the light field. The circle 320 (only one indicated by a reference numeral in the interest of clarity) represents the aperture function that could be used in the above algorithm, which as noted above is smaller than the full size of the captured data.

FIG. 3 thus illustrates the mathematical equivalent of performing a transformation on the underlying light field data (perhaps using some sort of interpolation) instead of shifting the virtual apertures.

None of the above is to imply that an aperture function is needed or that 2D reconstruction is necessary. The use of the aperture function in the above figures is merely to illustrate the effect the dolly-zoom would have in the example 2D reconstruction algorithm. Other 2D reconstruction methods may be used that do not utilize an aperture, and 2D reconstruction is not even necessary if method is applied as a 4D transform of the light field. The 4D light field itself may be modified, either by changing the coordinate mapping as in FIG. 2, or by transformation of the underlying data as in FIG. 3, and then stored for future processing.

FIGS. 2 and 3 illustrate two different approaches that are useful in different situations. The first approach (FIG. 2) is useful in cases where light field data is irregularly gridded, or in other cases where explicit coordinates of each light field point are known and/or preferred. The modified light field coordinates are then fed to downstream processing, such as for example projection for 2D reconstruction. The second approach (FIG. 3) is useful in cases of where light field data is regularly gridded, or in other cases where the light field coordinates are implicitly known. The underlying data is modified and passed onto downstream processing. This can be useful in the case of a light field display, for example. In the second case, the data may be modified such that the data ends up outside of the original implicit grid, as shown in FIG. 3. This can be compensated for by padding the original data before transformation.

Composing Multiple Transforms

For illustrative purposes, and without loss of generality, the technique of combining multiple transforms is described in terms of a 2D light field.

Since dolly zoom is mathematically a linear transform, it can be combined with other linear transforms by matrix multiplication. For example, refocus and dolly zoom operations can be combined by using one of two transforms:

$$\begin{bmatrix} s' \\ u' \end{bmatrix} = \begin{bmatrix} 1 & \lambda \\ 0 & 1 \end{bmatrix}\begin{bmatrix} 1 & 0 \\ \gamma & 1 \end{bmatrix}\begin{bmatrix} s \\ u \end{bmatrix} = \begin{bmatrix} 1+\lambda\gamma & \lambda \\ \gamma & 1 \end{bmatrix}\begin{bmatrix} s \\ u \end{bmatrix}$$

$$\begin{bmatrix} s' \\ u' \end{bmatrix} = \begin{bmatrix} 1 & 0 \\ \gamma & 1 \end{bmatrix}\begin{bmatrix} 1 & \lambda \\ 0 & 1 \end{bmatrix}\begin{bmatrix} s \\ u \end{bmatrix} = \begin{bmatrix} 1 & \lambda \\ \gamma & 1+\lambda\gamma \end{bmatrix}\begin{bmatrix} s \\ u \end{bmatrix}$$

The two transformations are not equivalent because composing transformations is not a commutative operation. Depending on the effect one wishes to achieve, the order of composition must be carefully selected.

In order to implement this in the previous example algorithm, step 2 can be modified in one of two ways.

| Dolly First: |  |
| --- | --- |
| 2.1 | First modify the (u, v) coordinates as u' = u + γs, v' = v + γt |
| 2.2 | Then modify the (s, t) coordinates as s' = s + λu', t' = t + λv' |
| 2.2.1 | Alternatively, modify the (s, t) coordinates at the same time as 2.1, as per the above equations<br>s' = s(1 + λγ) + λu, t' = t(1 + λγ) + λv |
| Refocus First: |  |
| 2.1 | First modify the (s, t) coordinates as s' = s + λu, t' = t + λv |
| 2.2 | Then modify the (u, v) coordinates as u' = u + γs', v' = v + γt' |
| 2.2.1 | Alternatively, modify the (u, v) coordinates at the same time as 2.1, as per the above equations<br>u' = u(1 + λγ) + γs, v' = v(1 + λγ) + γt |

One might be tempted to try to refocus and dolly simultaneously by using the following transform:

$$\begin{bmatrix} s' \\ u' \end{bmatrix} = \begin{bmatrix} 1 & \lambda \\ \gamma & 1 \end{bmatrix}\begin{bmatrix} s \\ u \end{bmatrix}$$

However this is not a valid coordinate transform. In particular it is possible to select λ and γ such that the matrix is singular and thus not invertible.

More complicated compositions can be used as well. For example:

$$\begin{bmatrix} s' \\ u' \end{bmatrix} = \begin{bmatrix} 1 & \lambda_2 \\ 0 & 1 \end{bmatrix}\begin{bmatrix} 1 & 0 \\ \gamma & 1 \end{bmatrix}\begin{bmatrix} 1 & \lambda_1 \\ 0 & 1 \end{bmatrix}\begin{bmatrix} s \\ u \end{bmatrix}$$

One use of this composition is to execute a dolly zoom where the constant-size depth is at a different depth than lambda zero. In this case, the first refocus effectively changes the zero lambda depth, the dolly zoom occurs, and then the second refocus undoes the first refocus. The second refocus is not simply the inverse of the first refocus (since the dolly action remaps the refocus depths), but this could be a good first approximation. Exact relations may be derived so to have the refocuses exactly cancel out.

Certain compositions of transforms may be expressed as other transforms as well. In some embodiments, the above composition is utilized with the values:

$$\lambda_1 = \lambda_2 = -\tan\left(\frac{\theta}{2}\right)$$

$$\gamma = \sin(\theta)$$

In that case, the transformation is equivalent to rotating the light field in the epipolar plane $$\begin{bmatrix} s' \\ u' \end{bmatrix} = \begin{bmatrix} \cos\theta & \sin\theta \\ -\sin\theta & \cos\theta \end{bmatrix}\begin{bmatrix} s \\ u \end{bmatrix}$$

Rotation by shearing is described, for example, in A. W. Paeth, A Fast Algorithm for General Raster Rotation, Computer Graphics Laboratory, Department of Computer Science, University of Waterloo, 1986.

Spatially Varying Transform

Neither the refocus parameter λ nor the dolly zoom parameter γ is required to be constant. Some embodiments of the refocus parameter λ or the dolly zoom parameter γ vary as a function of (s, t, u, v), or even (s', t', u', v'). For example, the dolly zoom parameter γ can vary as a function of (u, v) and the refocus parameter λ can vary as a function of (s, t). If γ(u,v) is a planar function, this mimics the physical action of tilting the lens. This is analogous to how sensor tilt can be mimicked by having λ(s, t) be a planar function.

One artistic effect is called "Lens Whacking", which is achieved by shooting with the lens free floating from the body. This means that focus and tilt effects are achieved by the relative placement of the lens to the sensor. By utilizing the ability to virtually produce tilt in both the lens plane and aperture plane, lens whacking effects can be performed computationally in a light field.

Depth-Based Transformations

In at least one embodiment, the dolly zoom effect represents a depth-dependent scaling of the image. Thus, many 2D transforms can be generalized to be depth dependent. One possible way for linear transforms is to use the equation $$\begin{bmatrix} s' \\ t' \\ u' \\ v' \end{bmatrix} = \begin{bmatrix} 1 & 0 & 0 & 0 \\ 0 & 1 & 0 & 0 \\ t_{11}-1 & t_{12} & 1 & 0 \\ t_{21} & t_{22}-1 & 0 & 1 \end{bmatrix}\begin{bmatrix} s \\ t \\ u \\ v \end{bmatrix} = \begin{bmatrix} I & 0 \\ T-I & I \end{bmatrix}\begin{bmatrix} s \\ t \\ u \\ v \end{bmatrix}$$

Where the linear transform is described by $$T = \begin{bmatrix} t_{11} & t_{12} \\ t_{21} & t_{22} \end{bmatrix}$$

In this simple case where T is a scaling matrix, $$T = \begin{bmatrix} s & 0 \\ 0 & s \end{bmatrix} \Rightarrow T-I = \begin{bmatrix} s-1 & 0 \\ 0 & s-1 \end{bmatrix}$$

It is apparent that this reduces to the dolly zoom equation in the case in which γ=s−1.

Another potentially interesting effect is rotation. In this case $$T = \begin{bmatrix} \cos\theta & \sin\theta \\ -\sin\theta & \cos\theta \end{bmatrix} \Rightarrow T - I = \begin{bmatrix} \cos\theta - 1 & \sin\theta \\ -\sin\theta & \cos\theta - 1 \end{bmatrix}$$

Using a small angle approximation this can be further simplified to $$\begin{bmatrix} \cos\theta - 1 & \sin\theta \\ -\sin\theta & \cos\theta - 1 \end{bmatrix} \approx \begin{bmatrix} 0 & \theta \\ -\theta & 0 \end{bmatrix}$$

Thus, the following transform produces a rotation in the image proportional to depth ("dolly twirl"):

$$\begin{bmatrix} s' \\ t' \\ u' \\ v' \end{bmatrix} = \begin{bmatrix} 1 & 0 & 0 & 0 \\ 0 & 1 & 0 & 0 \\ 0 & \theta & 1 & 0 \\ -\theta & 0 & 0 & 1 \end{bmatrix} \begin{bmatrix} s \\ t \\ u \\ v \end{bmatrix}$$

Figure 4:
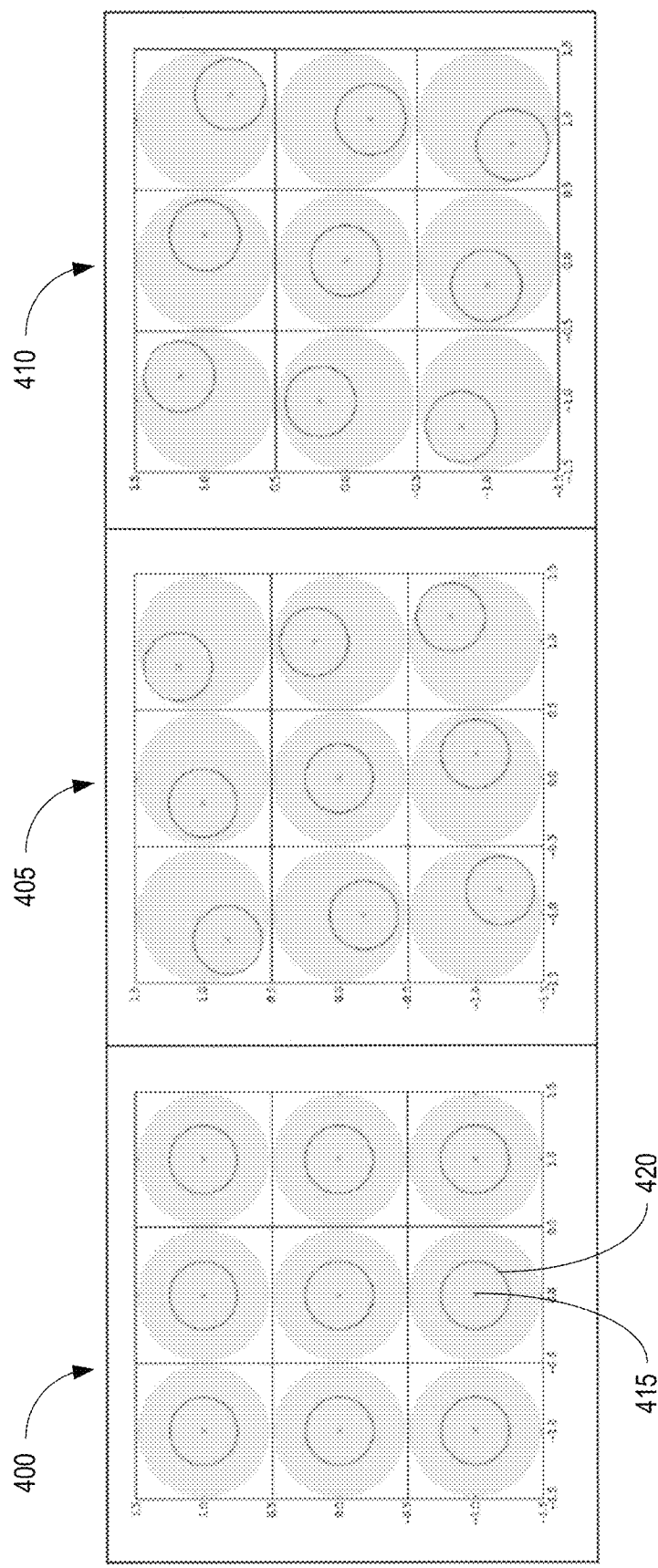
FIG. 4 illustrates a "dolly twirl" analogous to the dolly zoom of FIG. 2 according to some embodiments.

FIG. 4 illustrates a "dolly twirl" analogous to the dolly zoom of FIG. 2 according to some embodiments. From left to right there is shown: the original light field 400, the light field with negative theta 405, and the light field with positive theta 410. The central point 415 (only one indicated by a reference numeral in the interest of clarity) within each cell is the center of the (u, v) coordinate system. The gray areas represent valid data within the light field. The circle 420 (only one indicated by a reference numeral in the interest of clarity) represents the aperture function that could be used in the above algorithm, which as noted above is smaller than the full size of the captured data. The center (uv) location 415 of each st cell changes.

This technique can be further generalized to higher order transforms. For any given 2D transform, the identity part can be removed, and the remainder applied to the uv coordinates. This can be used to create effects that are otherwise not possible to produce using traditional camera setups.

For example, lens distortion (barrel and pincushion) is modeled as a quadratic transformation, with barrel and pincushion having opposite effects. If this distortion is applied proportionally to depth, the result is an image that has pincushion distortion for near objects and barrel distortion for far objects, or vice versa. Other distortions, such as perspective distortion, can be applied in this depth dependent manner as well.

Image Examples

Figure 5:
FIGS. 5 and 6 show examples of opposite extremes of a dolly-zoom action according to some embodiments.
Figure 6:

FIGS. 5 and 6 show examples 500, 600 of opposite extremes of a dolly-zoom action according to some embodiments.

Figure 7:
FIGS. 7 and 8 show examples of opposite extremes of a dolly-twirl action according to some embodiments.
Figure 8:
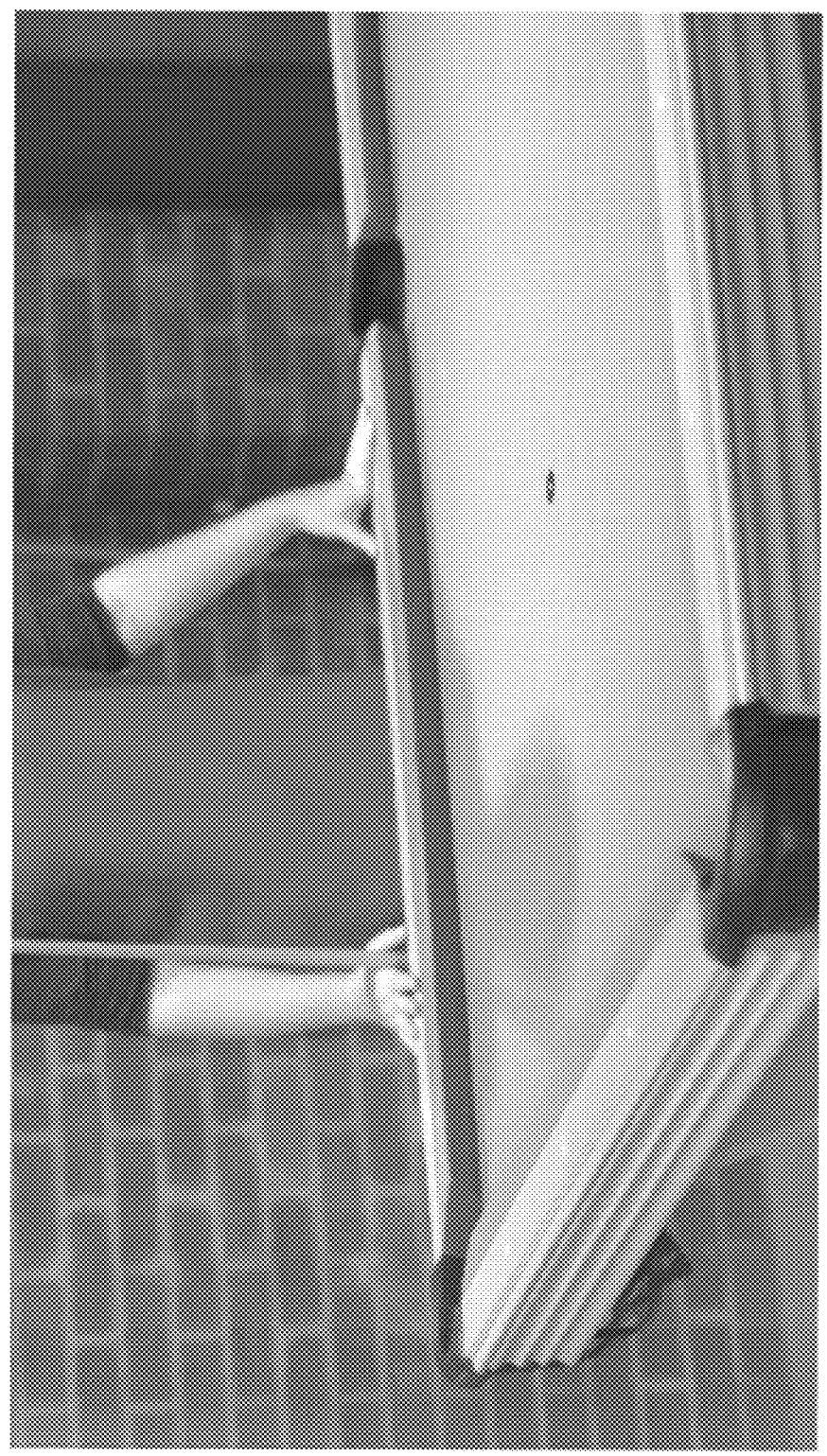

FIGS. 7 and 8 show examples 700, 800 of opposite extremes of a dolly-twirl action according to some embodiments.

Image Data Acquisition Devices

Figure 9:
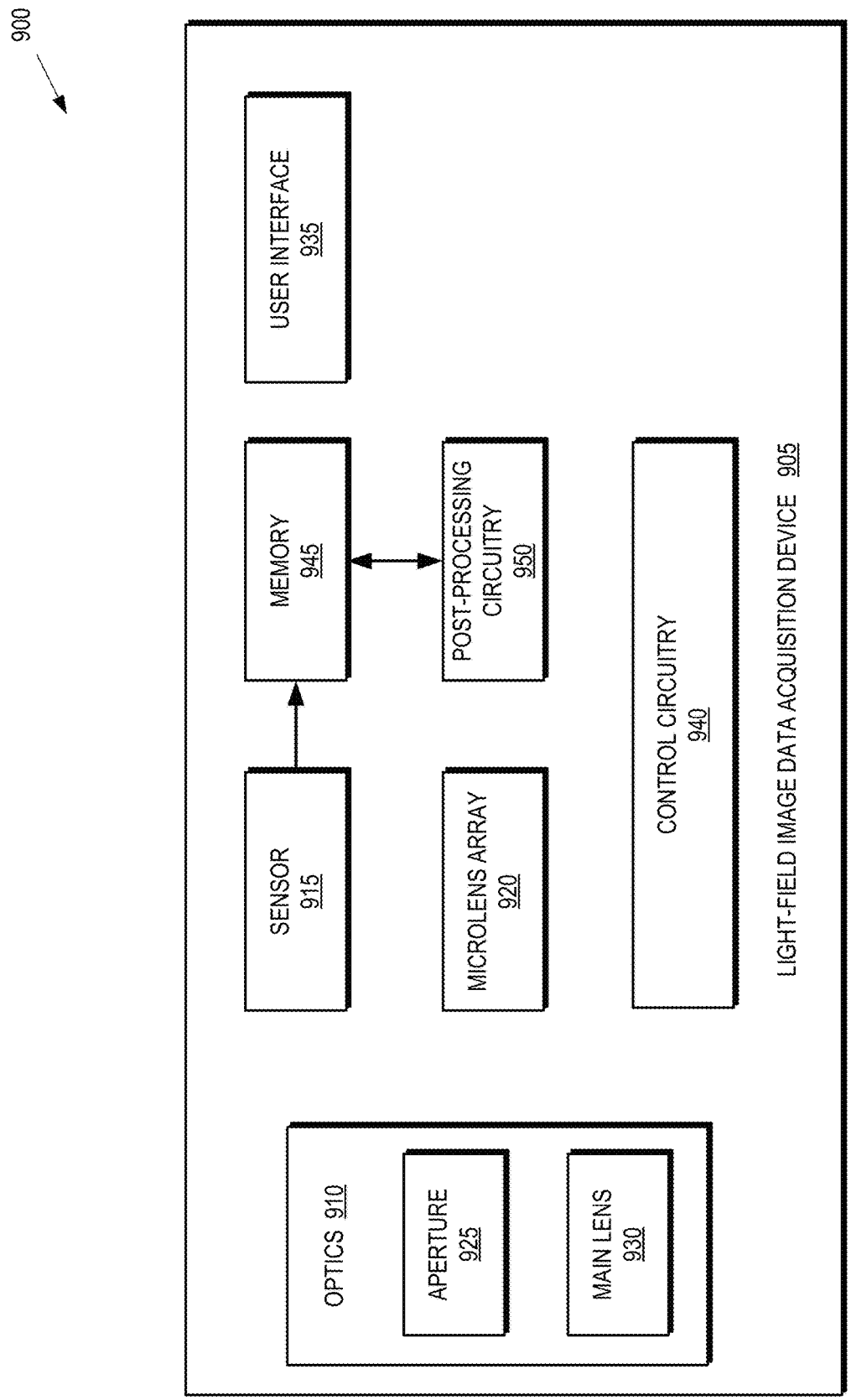
FIG. 9 is a block diagram of an architecture of a light field capture device such as a camera according to some embodiments.

FIG. 9 is a block diagram of an architecture 900 of a light field capture device such as a camera according to some embodiments. The light field capture device is used to implement some embodiments of the techniques described herein. In the illustrated embodiment, the light field capture device includes a light field image data acquisition device 905 that is configured to capture images using optics 910, an image sensor 915, which is implemented using a plurality of individual sensors for capturing pixels, and a microlens array 920. Some embodiments of the optics 910 include an aperture 925 for allowing a selectable amount of light into the light field capture device and a main lens 930 for focusing light toward the microlens array 920. Some embodiments of the microlens array 920 are disposed or incorporated in the optical path of the light field capture device so as to facilitate acquisition, capture, sampling of, recording, or obtaining light field image data via the sensor 915.

The light field image data acquisition device 905 includes the user interface 935 for allowing a user to provide input for controlling the operation of the light field capture device for capturing, acquiring, storing, or processing image data. Control circuitry 940 is used to facilitate acquisition, sampling, recording, or obtaining light field image data. For example, the control circuitry 940 can manage or control (automatically or in response to user input) the acquisition time and, rated acquisition, sampling, capturing, recording, or obtaining light field image data. Memory 945 is used to store image data, such as output from the image sensor 915. The memory 945 is implemented as external or internal memory, which can be provided as a separate device or location relative to the light field capture device. For example, the light field capture device can store raw light field image data output by the image sensor 915, or a representation thereof, such as a compressed image data file.

Post-processing circuitry 950 in the light field image data acquisition device 905 is used to access or modify image data acquired by the image sensor 915. Some embodiments of the post-processing circuitry 950 are configured to create dolly zoom effects using the image data, as discussed herein. For example, the post-processing circuitry 950 can include one or more processors executing software stored in the memory 945 to access and modify image data stored in the memory 945 to produce dolly zoom effects in images captured by the image sensor 915.

Figure 10:
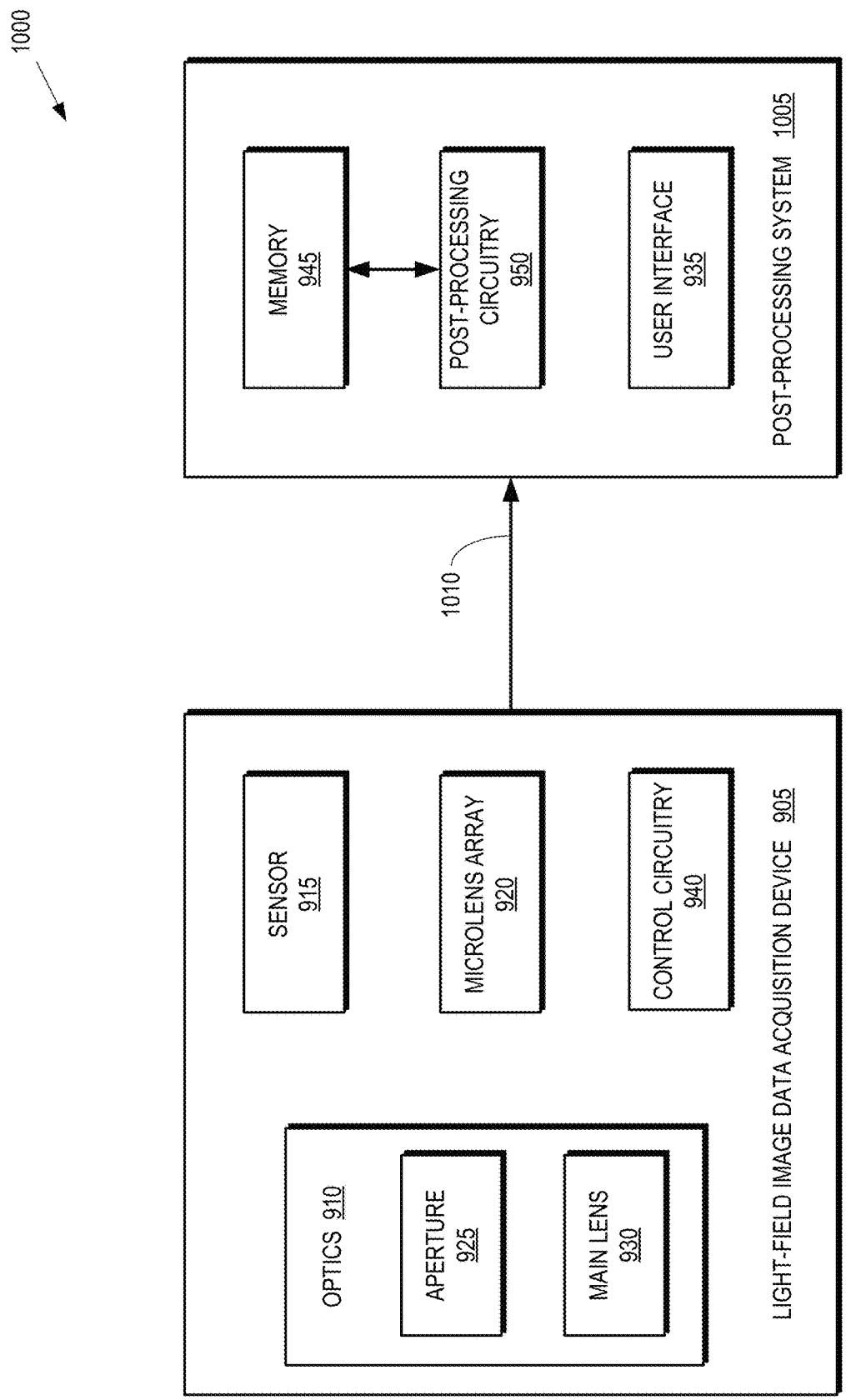
FIG. 10 is a block diagram of an architecture of a light field capture system according to some embodiments.

FIG. 10 is a block diagram of an architecture 1000 of a light field capture system according to some embodiments. The light field capture device is used to implement some embodiments of the techniques described herein. Elements in FIG. 10 that are referenced using the same reference numerals as corresponding elements in FIG. 9 perform the same or similar functions as the corresponding elements in FIG. 9. The architecture 1000 shown in FIG. 10 differs from the architecture 900 shown in FIG. 9 because the light field image data acquisition device 905 is implemented separately from a postprocessing system 1005, which includes the memory 945, the post-processing circuitry 950, and the user interface 935. The light field image data acquisition device 905 provides image data 1010 to the postprocessing system 1005.

Refocus Analogies

The above-described techniques may, by analogy, be applied to light field refocus as well. For example, the refocus analogy of the dolly twirl effect would be:

$$\begin{bmatrix} s' \\ t' \\ u' \\ v' \end{bmatrix} = \begin{bmatrix} 1 & 0 & 0 & \varphi \\ 0 & 1 & -\varphi & 0 \\ 0 & 0 & 1 & 0 \\ 0 & 0 & 0 & 1 \end{bmatrix} \begin{bmatrix} s \\ t \\ u \\ v \end{bmatrix}$$

What is claimed is:

1. A method comprising:
   determining four-dimensional (4D) coordinates of points in a light field;
   generating dollied coordinates from the 4D coordinates based on a dolly transform and a dolly parameter;
   applying an aperture function to filter rays in the coordinate system of the dollied coordinates, wherein the aperture function has a first value in a first region of an aperture plane and the aperture value has a second value in a second region of the aperture plane such that rays passing through the first region are accepted by the aperture function and rays passing through the second region are rejected; and
   projecting rays associated with the dollied coordinates from the light field onto corresponding points in an output raster.

2. The method of claim 1, wherein applying the aperture function to filter the rays in the coordinate system of the dollied coordinates comprises dollying a virtual aperture by a distance relative to the aperture plane.

3. The method of claim 2, wherein generating the dollied coordinates comprises applying a depth dependent dolly transformation to the 4D coordinates.

4. The method of claim 3, wherein dollying the virtual aperture produces a depth-dependent scaling of a two dimensional (2D) reconstructed image that is reconstructed from the light field.

5. The method of claim 1, further comprising:
   refocusing portions of the light field using a linear refocusing transform and a refocusing parameter.

6. The method of claim 1, wherein generating the dollied coordinates comprises generating the dollied coordinates by applying a quadratic dolly transform.

7. The method of claim 1, wherein generating the dollied coordinates comprises producing tilt in a lens plane and an aperture plane.

8. An apparatus comprising:
   a sensor configured to acquire a light field by imaging a scene; and
   a processor configured to:
      determine four-dimensional (4D) coordinates of points in a light field;
      generate dollied coordinates from the 4D coordinates based on a dolly transform and a dolly parameter;
      apply an aperture function to filter rays in the coordinate system of the dollied coordinates, wherein the aperture function has a first value in a first region of an aperture plane and the aperture value has a second value in a second region of the aperture plane such that rays passing through the first region are accepted by the aperture function and rays passing through the second region are rejected; and
      project rays associated with the dollied coordinates from the light field onto corresponding points in an output raster.

9. The apparatus of claim 8, wherein the processor is configured to dolly a virtual aperture by a distance relative to the aperture plane.

10. The apparatus of claim 9, wherein the processor is configured to apply a depth dependent dolly transformation to the 4D coordinates.

11. The apparatus of claim 10, wherein dollying the virtual aperture produces a depth-dependent scaling of a two dimensional (2D) reconstructed image that is reconstructed from the light field.

12. The apparatus of claim 8, wherein the processor is configured to refocus portions of the light field using a linear refocusing transform and a refocusing parameter.

13. The apparatus of claim 8, wherein the processor is configured to generate the dollied coordinates by applying a quadratic dolly transform.

14. The apparatus of claim 8, wherein the processor is configured to tilt an image in a lens plane and an aperture plane applying the dolly transform.

* * * * *